United States Patent

[11] 3,592,230

| [72] | Inventor | Miroslav J. Piroutek |
| | | Stamford, Conn. |
| [21] | Appl. No. | 818,568 |
| [22] | Filed | Apr. 23, 1969 |
| [45] | Patented | July 13, 1971 |
| [73] | Assignee | Self-Matic Valves Corp. |
| | | Stamford, Conn. |

[54] BACK PRESSURE DIRECTIONAL CONTROL VALVES EMPLOYING PILOT AIR OF LOW VOLUME AND PRESSURE
17 Claims, 9 Drawing Figs.

[52] U.S. Cl. .................................................. 137/625.66,
138/43, 138/46, 251/57
[51] Int. Cl. ...................................................... F16k 11/07
[50] Field of Search ........................................... 138/43, 45,
46; 137/625.6, 625.66; 251/127, 57; 91/318

[56] References Cited
UNITED STATES PATENTS

| 2,289,905 | 7/1942 | Dasher | 138/43 X |
| 2,641,279 | 6/1953 | Baldwin | 137/625.6 |
| 2,993,477 | 7/1961 | Panissidi | 137/625.63 |
| 2,993,511 | 7/1961 | Johnson | 137/625.64 |
| 3,189,050 | 6/1965 | Heckmann | 137/625.63 |
| 3,385,166 | 5/1968 | Kroffke | 137/625.6 X |
| 3,470,915 | 10/1969 | Bitzer et al. | 138/43 X |

Primary Examiner—Henry T. Klinksiek
Attorney—Blair, Cesari and St. Onge

ABSTRACT: The disclosed pneumatically actuated control valves utilize exceptionally low volume and low-pressure pilot air to shift the valve spool between valve positions. Hose having valveless, open ends continuously bleed pilot air and are simply adapted to have their open ends blocked by external system elements to develop sufficient back pressure for shifting the spool between valve positions. The volume of pilot air is adjustable so as to regulate the rate of back pressure buildup. In a self-actuated valve embodiment, pilot air blockage is performed by the spool itself and the valve cycles between valve positions automatically.

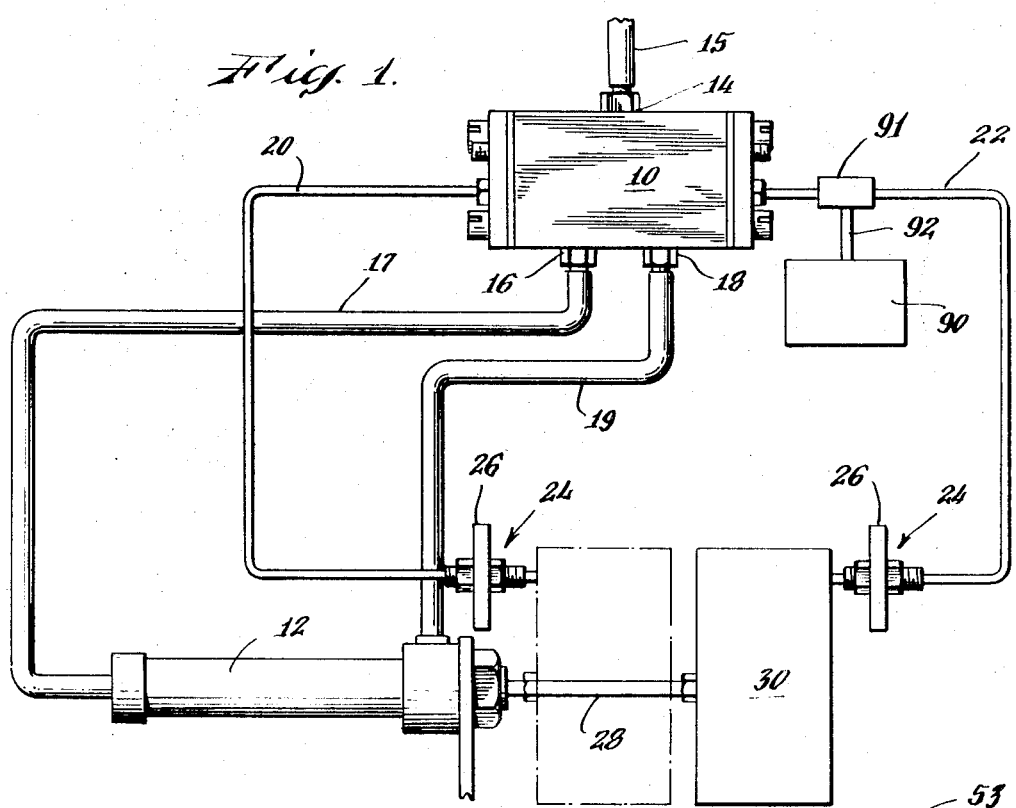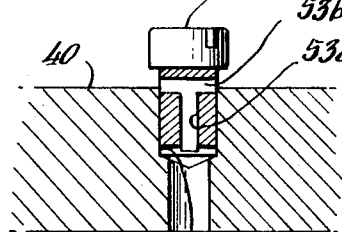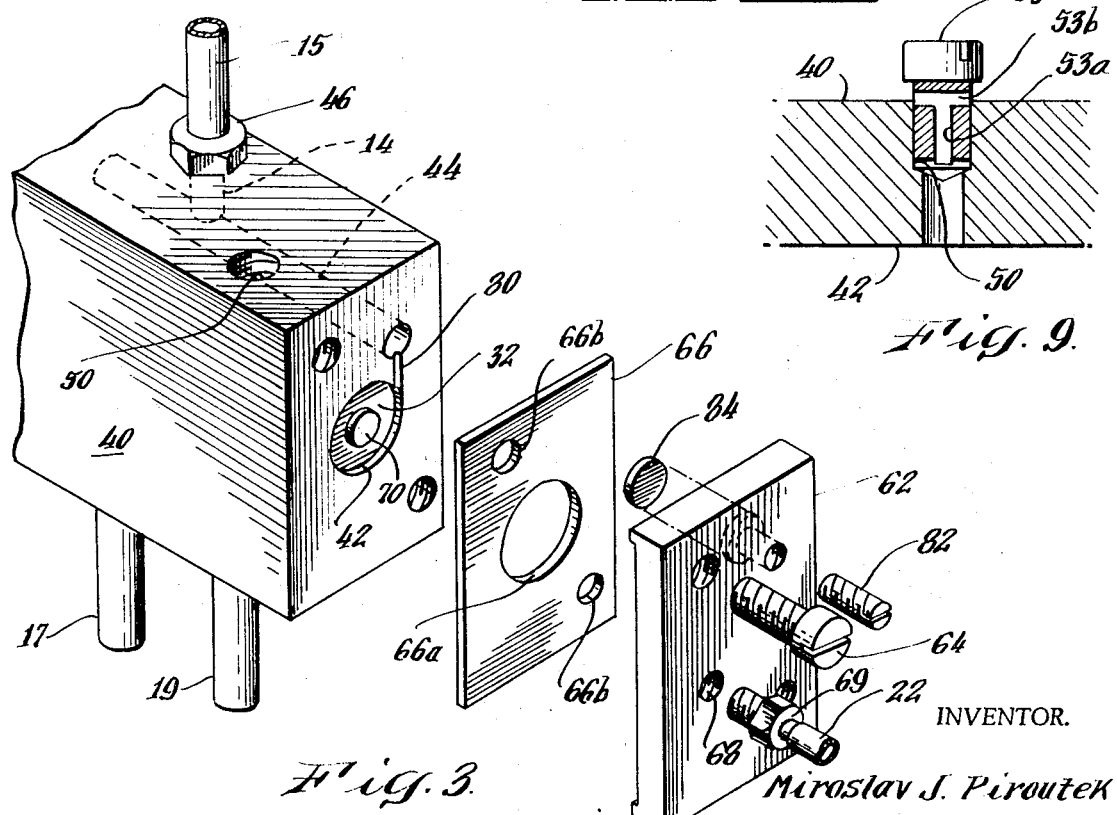

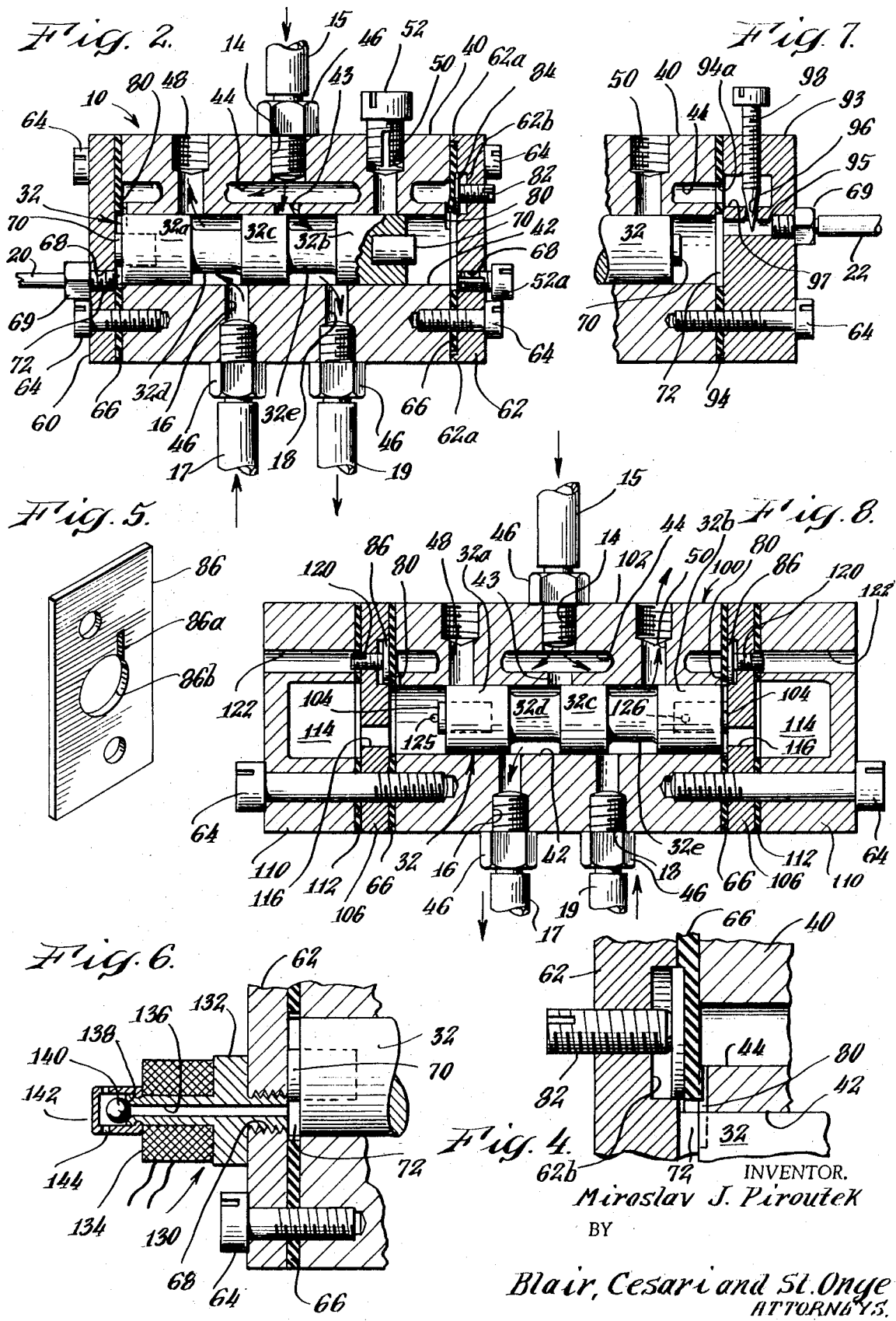

BACK PRESSURE DIRECTIONAL CONTROL VALVES EMPLOYING PILOT AIR OF LOW VOLUME AND PRESSURE

BACKGROUND OF THE INVENTION

Directional control valves used today generally fall into one of the following categories:

Solenoid actuated valves use electromagnetic force to shift the position of a spool or a poppet inside of the valve, and thus change the direction of fluid flow. These valves are relatively complex and expensive, and involve both electric and pneumatic circuitry.

Pressure pilot actuated valves use air pressure admitted through a pilot valve to the end of the main valve to shift its inside element, typically a spool. The return of the element, in this and other valves, can be achieved by the same method, or by a spring.

Bleed actuated valves use air pressure exhausted through a pilot valve from one end of the main valve, so that the pressure on the other end prevails, and shifts the inside element.

Back pressure actuated valves typically use pilot air continuously bleeding from an end of the main valve through a pilot valve which, when actuated, stops the bleeding. This builds up back pressure and shifts the inside element. The return, like in all previous types of valves, can be achieved from the other side by the same method, or a spring.

All presently available valves using pilot air for valve actuation discharge a considerable volume of this air, usually accompanied by obnoxious noise. Furthermore, the pilot valves used for actuation are relatively bulky and are thus difficult to accommodate in the typically limited space where the pilot valve actuating motion takes place. Also, the requisite pilot valve actuating force is not always available, particularly on machines handling and sensing the motion of small parts.

SUMMARY OF THE INVENTION

In accordance with the present invention, there is provided a pneumatically actuated fluid directional control valve of the "back pressure actuated" type which is easy to use, inexpensive to manufacture, and of compact size. The valve spool is shifted from one of its positions to the other by pilot air of extremely low pressure and volumetric flow. As a consequence, only a small volume of pilot air is being bled from each end of the valve. Consequently, the bleeding is noiseless and places no significant drain on the source of compressed air.

A particular advantage of these control valves is that they do not require separate pilot valves as such for selectively controlling the flow of pilot air. In contrast wit prior control valves, the control valves of my invention utilize separate hose or conduit communicating with each end of the valve spool, other ends of the hose being open and valveless. The open ends of the pilot air hose can be remotely positioned where system operating elements can merely block the exhaust of pilot air, thereby developing a back pressure sufficient to shift the spool position. The low volume of pilot air requires only very small diameter hose or conduit, which at the same time causes high velocity of flow and instant actuation when blocked.

As an additional feature of my control valve, I provide means for regulating the flow of pilot air to each end of the valve spool and through the hose. In this manner, I can regulate the buildup of back pressure, and thus achieve a variable delay from the time the flow of pilot air is blocked to the time when the valve spool shifts to its other valve position. This feature adds very little to the cost of the valve and makes for a more versatile control valve capable of a wide variety of applications.

Rather than being actuated externally, the control valve of my invention may be adapted for self-actuation in that the valve spool is shifted back and forth automatically. In this embodiment, bleed ports for the pilot air are alternately closed off by the valve spool itself. Thus, when the valve spool is in one position, the pilot air bleed port on that side is closed by the valve spool. Back pressure builds up to the point where the spool is shifted to the other position, blocking the other pilot air bleed port, and the operation repeats. Again, the volume of pilot air supplied to each end of the valve spool may be regulated in order to control the buildup of back pressure, and thus the cycling rate of the valve.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the nature and objects of the invention, references should be had to the following detailed description taken in connection with the accompanying drawings in which:

FIG. 1 is a diagrammatic illustration of a system application for the directional control valve of my invention;

FIG. 2 is a longitudinal sectional view of the control valve;

FIG. 3 is an exploded perspective view of one end of the valve body, an endplate and an intermediate gasket;

FIG. 4 is an enlarged, fragmentary sectional view of a portion of the valve showing an adjustability feature of one embodiment of my invention;

FIG. 5 is a perspective view of a modified form of gasket used in the control valve of my invention;

FIG. 6 is an enlarged fragmentary sectional view of one end of the control valve incorporating alternative valve actuating means;

FIG. 7 is an enlarged fragmentary sectional view of one end of the control valve incorporating alternative adjustability means;

FIG. 8 is a longitudinal sectional view of a self-actuating control valve constructed according to an alternative embodiment of my invention; and FIG. 9 is a fragmentary sectional view of the exhaust port portion of the control valve in which is incorporated a flow metering screw.

Similar reference numerals refer to corresponding parts throughout the several views of the drawings.

DETAILED DESCRIPTION

Referring now to the drawings, a fluid directional flow control valve, constructed according to my invention and generally indicated at 10, is shown in FIG. 1 as incorporated in a system for actuating a cylinder, generally indicated at 12. Fluid under pressure from a source (not shown) is supplied to an inlet port 14 of valve 10 through a conduit 15. While I prefer to use air as the working fluid, it will be appreciated that other fluids, including liquids, could be employed.

Valve 10 is provided with a pair of outlet ports 16 and 18, which are respectively coupled by conduits 17 and 19 to opposite ends of the cylinder 12. Depending upon the position of valve 10, air supplied through conduit 15 to inlet port 14 flows through either outlet 16 or 18 and conduit 17 or 19, respectively, forcing a piston (not shown) within cylinder 12 to move in one direction or the other.

In order to change the position of valve 10 and thus the direction of airflow into and out of cylinder 12, pilot hose 20 and 22 are coupled to opposite ends of the valve to conduct pilot air therefrom. Preferably, pilot air is tapped from the air supplied to inlet port 14. If the working fluid is a liquid, it may be preferable to provide a separate pilot air source. Hose 22 is shown to a T-coupling 91 which provides for a connection to an auxiliary chamber 90 through conduit 92. The provision of chamber 90 is a feature which will be considered later.

In the system application of valve 10 shown in FIG. 1, the open ends of hose 20 and 22 are mounted in opposed relation by fittings 24 secured to brackets 26. An actuating rod 28, connected to the piston within cylinder 12, reciprocates a slide 30 which here represents any machine part to be actuated between positions closing off the open end of either hose 20 or hose 22. When the slide 30 is in the solid line position shown in FIG. 1 blocking the open end of hose 22, a back pressure is building up in the right end of valve 10. Pilot air bleeds freely from the open end of hose 20. Ultimately, this back pressure reaches the point where valve spool 32 (FIG. 2) is forced to the left end of the valve. As a result, inlet port 14 is coupled to outlet port 18, and air is forced through conduit 19 into the right end of cylinder 12, moving the piston to the left. The slide 30 then moves to a position closing off the open end of hose 20, creating a back pressure at the left end of valve 10, ultimately forcing the spool 32 to the right. Inlet port 14 is then coupled to outlet port 16 and air is forced through conduit 17 into the left end of cylinder 12, forcing the piston therein to the right. The slide 30 then assumes its other position blocking the open end of hose 22, and the operation repeats.

The directional control valve 10 of the invention is subject to various modifications, as will be exemplified in the drawings. Basically, as seen in FIG. 2, the control valve 10 comprises a valve body 40 having a bore 42 extending longitudinally therethrough for accommodating the spool 32. The inlet port 14 in the valve body 40 communicates with the bore 42 through an opening 43 and also with a longitudinal passageway 44 extending coextensively with bore 42. The inlet port 14 is tapped to receive a threaded fitting 46 to which the conduit is coupled.

Also communicating with bore 42 are the pair of outlet ports 16 and 18. These outlet ports are also tapped to receive threaded fittings 46 for coupling to conduits 17 and 19. The valve body 40 is also formed having a pair of exhaust ports 48 and 50 communicating with bore 42. Exhaust port 48 is open to the atmosphere, while exhaust port 50 is shown in FIG. 5 accommodating a slotted screw 52, which acts as a flow-metering valve. This slotted screw is an optional element which may be employed if it is desired to retard the rate of movement of the piston within cylinder 12. (FIG. 1).

The spool 32, as seen in FIG. 2, is formed having a pair of end lands 32a and 32b and a middle land 32c. Spool lands 32a and 32c are separated by an annular groove 32d while land 32c is spaced from land 32b by an annular groove 32e.

When the spool 32 is in its leftmost position, as shown in FIG. 2, inlet port 14 communicates with outlet port 18 by way of the annular groove 32e in the spool. Land 32b closes off exhaust port 50 while land 32c isolates the inlet port from outlet port 16 and exhaust port 48. As a consequence, air under pressure flows from the inlet port 14 to the outlet port 18 and through conduit 19 into the right end of cylinder 12 (FIG. 1). The piston within cylinder 12 is forced to move to the left. In moving to the left, the air ahead of the piston is forced out of cylinder 12 and exhausted through conduit 17, outlet port 16, annular spool groove 32d, and exhaust port 48. Since the flow of air out of exhaust port 48 is unrestricted, the movement of the piston in cylinder 12 is unimpeded and therefore moves to the left at a rapid rate.

When the spool 32 is in its rightmost position inlet port 14 communicates with outlet port 16 while outlet port 18 communicates with exhaust port 50. Spool land 32a closes off exhaust port 48. As a consequence, air from inlet port 14 goes through annular groove 32d, outlet port 16 and conduit 17 into the left end of cylinder 12. This forces the piston within cylinder 12 to the right in FIG. 1 and the air ahead of it is exhausted through conduit 19, outlet port 18, annular groove 32e and exhaust port 50.

Spools with other dispositions of lands can be used in a similar way, as is commonly known in the valve art.

When the slotted screw 52 is threaded into exhaust port 50 (and/or exhaust 48), the air ahead of the piston in cylinder 12 is metered out of exhaust port 50 at a low volumetric rate. Alternatively, this metering function can be obtained using a screw 53 shown in FIG. 9 having an axial bore 53a intersecting a lateral bore 53b. As a consequence, a back pressure is exerted on the piston, causing it to move at a slower rate. The rate at which the piston in cylinder 12 moves to the right as seen in FIG. 1, is adjustable by varying the extent to which slotted screw 52 is threaded into exhaust port 50.

The provision for shifting the positions of spool 32 will now be described. Referring to FIG. 2, an endplate 60 is secured to valve body 40, closing off the left end of the bore 42, while an endplate 62 closes off the right end of the bore. The endplates are secured in place by bolts 64. Interposed between each endplate and the valve body is a resilient gasket 66, as best seen in FIG. 3. The endplates 60 and 62 are formed having pilot air ports 68 into which are threaded fittings 69 for coupling to the ends of hose 20 and 22 (FIG. 1).

Each end of the spool 32, as seen in FIG. 2, is formed having a small abutment 70 extending beyond the ends of spool lands 32a and 32b. These abutments serve to provide an annular space 72 between the spool ends and the endplates when the spool assumes either of its two positions. The abutment 70 may constitute small magnets inserted into the spool ends to serve as detents releasably detaining the spool 32 at one or the other of its two end positions. The pilot ports 68 in the endplates are offset such that they communicate with annular spaces 72 and are not closed off by abutments 70.

As seen in FIG. 3, gaskets 66 at each end of the valve body 40 are formed having a central hole 66a of somewhat larger diameter than bore 42. Holes 66b in gasket 66 accommodate the passage of screws 64 securing the endplates in place.

As best seen in FIG. 3, each end of the valve body 40 is formed with a small V-shaped groove 80 extending between corresponding ends of the passageway 44 and the bore 42. Thus, pilot air tapped from the inlet port 14 flows in both directions through passageway 44 and then is metered through the grooves 80 into the space between the endplates and each end of the spool. This pilot air is then exhausted through the pilot ports formed in the endplates.

As was generally described in connection with FIG. 1, when the exhaust of this pilot air from the end of the valve at which the spool is positioned is blocked, a back pressure is developed which ultimately increases to a magnitude sufficient to overcome the magnetic detent and force the spool to the other end of the valve.

The endplates 60 and 62 in FIG. 2 are of different designs to illustrate alternative embodiments of the invention. Endplate 60 has an overall flat surface confronting the gasket 66 and the mounting screws 64 are selectively tightened down to adjust the compression of gasket 66. It will be appreciated that as the gasket is being compressed, it flows into the groove 80, reducing the groove cross section through which the pilot air flows from passageway 44. This produces a corresponding reduction in the volume of pilot air flowing into the space between the spool ends and the endplates, which space is exhausted through the pilot ports. As the volumetric flow rate of pilot air is decreased, a corresponding reduction in the rate of back pressure buildup in annular space 72 is achieved when the exhaust of pilot air is blocked. There is thus provided a variable delay between the time of blockage of the open end of the pilot hose and the time when the spool 32 shifts from its leftmost position to its rightmost position. I have found that delays varying from small fractions of a second to several seconds can be obtained by simply varying the overall compression of resilient gasket 66 between endplate 60 and valve body 40.

Still referring to FIG. 2, endplate 62 is alternatively constructed having inwardly extending steps 62a running along the top and bottom edges thereof. The steps 62a serve to space the inner surface of endplate 62 from the end of the valve body 40. The height of steps 62a is somewhat less than the thickness of gasket 66, such that when endplate 62 is secured in place by bolts 64, the gasket is compressed to a predetermined extent to provide an effective fluid seal.

To vary the cross section of groove 80, and thus adjustably meter the flow of pilot air therethrough, a screw 82 is adjustably threaded through the endplate 62 to bear against the portion of gasket 66 overlying groove 80, as most clearly seen in FIG. 4. Preferably, to prevent the end of screw 82 from damaging gasket 66, endplate 62 is recessed at 62b to accommodate a small metal disc 84 which is interposed between the end of screw 82 and the gasket 66. Thus, the adjustable compressive force exerted by screw 82 is communicated over a larger area of the gasket 66 by the disc 84. I find that the compressed portion of gasket 66 can substantially overlie the exit of passageway 44, with only the entry portion of groove 80 being varied in cross section.

It will be appreciated that rather than forming the groove 80 in the end surface of valve body 40, a corresponding groove could instead be formed in the inner surface of the endplate. In this case, the gasket 66 would be formed having a hole in registry with the end of passageway 44. Alternatively, a groove could be molded in the gasket such as to communicate the end of passageway 44 with the space between the spool ends and the endplates.

In still another alternative embodiment, the gasket may be formed in the manner shown in FIG. 5. In this case, instead of forming a groove in either the valve body, gasket or endplate, a gasket 86 is formed with a slot 86a extending from its central aperture 86b to the exit of passageway 44 when the gasket is in place. When gasket 86 is compressed, the material of the gasket spreads, thus narrowing the width of the slit 86a, thereby reducing the volume of pilot air flowing therethrough.

In an additional embodiment of my invention, adjustability is achieved without employing groove 80, or its equivalent. Instead, as seen in FIG. 7, a needle valve technique is employed to meter the flow of pilot air. Thus, an endplate 93 is secured to the ends of valve body 40 by bolts 64 with a centrally apertured gasket 94 therebetween. The endplate 93 is formed having a pilot port 95 which is joined by a passage 96. This passage is joined to passageway 44 in valve body 40 by a second passage 97 and registered hole 94a in gasket 94. A metering screw 98 is adjustably threaded into endplate 93 to regulate the flow of pilot air through passage 96 into the annular space 72 between the spool end and endplate 98, which space is exhausted through pilot port 95.

Returning to FIG. 2, the pilot port 68 in endplate 62 is shown receiving a slotted screw 52a for modifying the valve operation. The slotted screw 52a is adapted to bleed pilot air from the right end of the valve at a lesser rate than is normally bled from the other valve end. Consequently, there is a prevailing back pressure which forces the spool 32 to its left end position when the left pilot port is unblocked. However, when the left pilot port is blocked, the resulting back pressure will predominate, forcing the spool to its right end position. As soon as the left pilot port is unblocked, the lesser, but prevailing back pressure at the right end will return the spool to its left end position. Thus, when utilizing slotted screw 52a in one of the pilot ports, the spool will automatically return after each actuation.

Referring to FIG. 6, rather than employ pilot air hose whose open ends are blocked to achieve valve actuation, I may employ a solenoid actuated pilot valve, generally indicated at 130, to the same end.

The use of pilot valve 130 in control valve 10 offers many advantages over solenoid piloted control valves as used today. It uses solenoid action on pilot air of much lower pressure and volume, and consequently the solenoid pilot valve can be made much smaller, simpler and less expensive than any solenoid pilot valve presently available. The pilot valve 130 includes a core 132 of magnetically permeable material which is threaded into the pilot port 68 in the endplate 62. In valves using spools with magnets the core may be attached to a nonmagnetic adapter which, in turn, is threaded into the endplate, thus avoiding magnetic interference. A winding 134 encompasses the core 132 which has a longitudinal bore 136 therethrough communicating with the annular space 72 between the endplate and the spool end. The outer end of the fitting is shaped as a valve seat 138 accommodating a ball 140 or otherwise shaped plug of magnetically permeable material.

A nonmagnetic cup 142, having vents 144, retains the ball 140 in sufficient proximity to the valve seat 138 so as to be attracted into position blocking bore 136 when the winding 134 is energized. Otherwise, the force of the pilot air unseats ball 140 permitting its exhaust through vents 144.

Returning to FIG. 1, the range of time delay adjustability of the control valve 10 may be increased by expanding the effective volume of annular space 72 at one or both ends of the valve. To this end, chamber 90 effectively providing this additional volume is coupled to pilot hose 22 by a T-coupling 91 and a short hose section 92. This additional volume expands the space in which pilot air back pressure is built up upon blockage of the open end of the pilot hose 22. This results in a considerable extension in the time required for the back pressure to build up to the point where the spool 32 is forced from its right end position to its left end position. I have found that I can obtain a time delay of many seconds from the time the pilot hose is blocked to the time when the spool 32 is shifted to its other position. Rather than a separate chamber 90, the endplates may be enlarged to provide the additional volume.

In some applications, the adjustability feature of my invention may be unnecessary. In this event, it will be appreciated that gasket 66 may be eliminated or replaced with a gasket of nonresilient material. Of course, under these conditions, the cross section of groove 80 (FIG. 2) is no longer variable. However, I have found that by limiting the volume of pilot air bled from each side of the valve to a magnitude many times lower than that of prior "back pressure actuated" control valves significant operational advantages are obtained. The pilot air represents an extremely small drain on the compressed air source and its exhaust is practically not noticeable. Most significant, however, is the fact that by virtue of the low volume and low pressure of pilot air, actuation of the valve may be effected by a very small force acting to block the escape of pilot air. As a consequence, no pilot valves, as such, are required to actuate the control valve. As indicated in FIG. 1, valve actuation may be achieved by merely bringing an operating element (slide 30) into a position blocking the open end of the pilot hose, the elasticity of which provides an excellent seal. A considerable savings is obtained by eliminating the need for pilot valves. Moreover, a simplification of the pneumatic circuit is achieved. Also important is the resulting small size of fittings which hold hose in position for sensing (blockage) as compared with relatively bulky pilot valves which are often difficult to accommodate in a limited space. Furthermore, often the hose can be anchored directly in a hole drilled through a machine frame or other stationary machine part which happens to be in suitable position against a moving part used for actuation. Also, one may drill a small hole through a machine slide bed and feed pilot air by the hose into this hole. When the slide covers up the hole on the other side, the valve is actuated.

Rather than incorporating the groove 80 in the end surface of the valve body, it will be appreciated that the inlet and exhaust ports may be interchanged such that air is introduced into bore 42 through the exhaust ports and exhausted through the inlet port and then grooves may be formed in either the wall of the bore 42 adjacent its ends or in the peripheral surface of spool lands 32a and 32c to leak pilot air to each end of the valve. Also, the clearance between the spool and the bore may be adjusted so as to allow for the leakage of pilot air therebetween. Alternatively, pilot air may be admitted to each end of the valve through restricted passages drilled in the valve spool itself.

Referring now to FIG. 8, the principles of my invention may be utilized to provide a self-actuating directional flow control valve, generally indicated at 100. The body 102 of control valve 100 is constructed in the manner of the body 40 of control valve 10. (FIG. 2). That is, the valve body 102 is formed having an inlet port 14 communicating with a bore 42 through an aperture 43. Outlet ports 16 and 18 also communicate with bore 42, as do exhaust ports 48 and 50. The inlet port 14 also communicates with a longitudinal passageway 44 extending coextensively with bore 42. The spool 32 of valve 100 is constructed in the manner of spool of valve 10 having valve segments of 32a, 32b and 32c separated by annular grooves 32d and 32e. In order to retain the spool at either of its two valve positions, the ends of spool 32 are recessed to receive magnets 104 which serve as magnetic detents. The outer ends of the magnets 104 extend beyond the ends of the spool 32 to serve as abutments providing an annular space between the spool ends and each endplate 106.

As in the case of valve 10, each end surface of the valve body 102 is formed having a groove extending between each end of the passageway 44 and the corresponding end of the bore 42. Gaskets 66 are interposed between endplates 106 and each end of the valve body 102. Headers 110 are positioned against the outer surface of each endplate 106 and are secured in place by elongated bolts passing through the header, the endplate, the gasket 66 and into tapped holes in the valve body 102. Gaskets 112 are interposed between the headers 110 and endplates 106.

Each header 110 is formed having a cavity 114 which is in communication with its associated end of bore 42 through a hole 116 formed in associated endplate 106. Adjustability of the control valve operation is achieved in the manner described in connection with endplate 62 of FIG. 2. That is, a setscrew 120 is threaded through each endplate 106 and adjustably compresses the portion of the gasket 66 overlying groove 80 through the medium of a small disc 86. Each header 110 is provided with an elongated bore 122 permitting access to setscrew 120.

Spaced inwardly from the left end of bore 42, a laterally extending pilot air exhaust port 125 is formed in valve body 102. A corresponding exhaust port 126 is provided adjacent the other end of the bore. Depending upon the position of spool 32, one of the ports 125 and 126 is open to the atmosphere to permit bleeding of pilot air from one end of the bore while the other port is blocked.

In the operation of valve 100, when the spool 32 is in its right end position as in FIG. 8, exhaust port 126 is closed off by valve segment 32b while port 125 at the other end of bore 42 is open. As a consequence, pilot air is bled from the left end of the valve and no back pressure is developed. On the other hand, since port 126 is blocked, back pressure begins to develop in the annular space between the right end of spool 32 and endplate 106. The cavity 114 in header 112 serves to accumulate a sufficient amount of compressed air to shoot the spool all the way to the left end of the bore 42 the moment the pilot air back pressure is built up to the point where it overcomes the force of the magnet 126. For the same reason the magnets have to be of significant strength. As a result, port 125 is blocked by spool lands 30a while port 126 at the other end of bore 42 is open. Back pressure then builds up at the left end of the spool. After a predetermined period of time, established by adjustment of the setscrew 120, the back pressure overcomes the force of the magnet in the left end of spool 32, and the spool is returned to its right end position. It is seen that this operation continues without external actuation.

As in the application of FIG. 1, conduit connected to the outlet ports 16 and 18 of valve 100 may be coupled to opposite ends of cylinder 12. However, in applying valve 100 to this system application, pilot hose 20 and 22 are not required since the control valve cycles automatically. It will be appreciated if it is desired to slow down the rate of movement of the piston in cylinder 12 controlled by valve 100, slotted screws may be threaded into the exhaust ports as was described in connection with FIG. 2.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A pneumatically actuated control valve, comprising, in combination:
  A. a valve body having
    1. an inlet port,
    2. a pair of outlet ports, and
    3. a bore therethrough;
  B. a spool movable in said bore between end positions to divert fluid from said inlet port to one or the other of said outlet ports;
  C. an endplate secured to said valve body closing off each end of said bore, said endplates having
    1. a pilot port formed therein communicating with said bore;
  D. means forming a passageway for conveying pilot air from said inlet port to each end of said bore, each said passageway having
    1. a restricted section of a cross section substantially smaller than the cross sections of said inlet port and said pilot ports; and
  E. a pilot conduit coupled to at least one of said pilot ports and having an open, valveless end continuously bleeding pilot air from said one end of said bore,
    1. said pilot conduit open end secured in a position where it is closed off by an external operating element to create a back pressure at said one end of said bore forcing said spool to the other end thereof.

2. The control valve defined in claim 1, and
  A. means for adjusting the cross section of said restricted section of at least one of said passageways
    1. whereby to adjustably control the rate of back pressure buildup.

3. The control valve defined in claim 2, wherein said restricted section is formed in one end surface of said valve body, and
  1. said adjusting means includes a resilient gasket disposed between said valve body end surface and one of said endplates,
    a. said gasket being adjustably compressed to vary the cross section of said restricted section.

4. The control valve defined in claim 2, wherein a segment of said passageway is formed in one of said endplates, and
  1. said adjusting means includes a metering valve incorporated in said one endplate, said metering valve having
    a. a screw adjustably threaded into said passageway segment to create said restricted section of variable cross section.

5. The control valve defined in claim 1, wherein said outlet ports are adapted to be coupled to opposite ends of a cylinder adapted to reciprocate a machine element, said machine element at the end of the stroke adapted to close off the open end of said pilot conduit, thereby creating a back pressure forcing said spool to the other end of said bore.

6. A directional flow control valve, comprising, in combination:
  A. a valve body having
    1. an inlet port,
    2. a pair of outlet ports; and
    3. a bore therethrough;
  B. a spool movable in said bore between end positions to divert fluid from said inlet port to one or the other of said outlet ports;
  C. an endplate secured to said valve body closing off each end of said bore;
  D. means forming passageways for conveying pilot air from said inlet port to each end of said bore, at least one of said passageways having
    1. a restricted section of a cross section substantially smaller than the cross sections of said inlet port and said pilot ports;
  E. separate means for bleeding pilot air from each end of said bore; and
  F. means for adjusting the cross section of said restricted passageway section to vary the flow of pilot air therethrough, 1. whereby to vary the rate of rise in back pressure developed at one end of said bore by blockage of said means bleeding pilot air therefrom, said back pressure serving to force said spool from one of its end positions to the other.

7. The valve defined in claim 6 wherein said restricted passageway section is in the form of a groove machined in an end surface of said valve body, and said adjusting means includes 1. a resilient gasket disposed between said end surface and one of said endplates and overlying said groove,
   a. said gasket being adjustably compressed to vary the cross section of said groove.

8. The valve defined in claim 7 wherein said adjusting means further includes 1. a screw adjustably threaded through said one endplate to adjustably compress the portion of said gasket overlying said groove.

9. The valve defined in claim 6 wherein a segment of said passageway is accommodated in one of said endplates, and said adjusting means includes 1. a screw adjustably threaded into said passageway segment to create said restricted passageway action of variable cross section.

10. The valve defined in claim 6, wherein said restricted passageway section is provided in each said passageway and each said restricted passageway section is varied in cross section by separate adjusting means.

11. The valve defined in claim 6, wherein said adjusting means includes 1. a resilient gasket interposed between one of said endplates and an end surface of said body,
   a. said gasket being formed having a slit extending from a central aperture registered with one end of said bore, said slit providing said restricted passageway section; and
   b. said gasket being compressed to vary the width of said slit.

12. The valve defined in claim 6, wherein said pilot air bleeding means are provided by pilot ports formed in said endplates; and G. a partial restriction inserted in one of said pilot ports to create a prevailing back pressure for automatically returning said spool to the other end of said bore after being actuated by a temporary blockage of the other of said pilot ports.

13. The valve defined in claim 6, wherein said pilot air bleeding means are provided by pilot ports formed in said endplates; and G. a solenoid actuated pilot valve incorporated in at least one of said pilot ports,
   1. said pilot valve being actuated to block the exhaust of pilot air from said one pilot port 14. The valve defined in claim 6, wherein one of said pilot air bleeding means includes 1. means forming an auxiliary volume communicating with one of said bore ends and in which said back pressure is developed,
   a. thereby to retard the rise of back pressure in said one bore end.

15. The valve defined in claim 6, wherein said valve body is formed having an exhaust port selectively coupled with an associated one of said inlet ports by said spool such that, when air is routed from said inlet port to one of said outlet ports and to one end of an external cylinder, air is exhausted from the other end of the cylinder through the other of said outlet ports and its associated exhaust port; and G. a slotted screw incorporated in said associated exhaust port to adjustably regulate the flow of air exhausted therefrom.

16. The valve defined in claim 6, wherein said valve body is formed having an exhaust port selectively coupled with an associated one of said inlet ports by said spool such that, when air is routed from said inlet port to one of said outlet ports and to one end of an external cylinder, air is exhausted from the other end of the cylinder through the other of said outlet ports and its associated exhaust port; and G. a screw having intersecting axial and lateral bores incorporated in said associated exhaust port to adjustably regulate the flow of air exhausted therefrom.

17. The valve defined in claim 6, wherein said pilot air bleeding means includes 1. separate bleed ports formed in said valve body inwardly spaced from each end of said bore
   a. said bleed ports being alternately blocked by said spool as it reciprocates between its end positions in said bore,
   b. whereby to alternately develop back pressure at each end of said bore so as to automatically reciprocate said spool.